United States Patent [19]

Maisel et al.

[11] Patent Number: 4,837,850

[45] Date of Patent: Jun. 6, 1989

[54] HIERARCHIC SYNCHRONIZATION METHOD AND CIRCUIT ARRANGEMENT FOR EXCHANGES OF A MESH TELECOMMUNICATION NETWORK

[75] Inventors: Manfred Maisel, Igensdorf; Erich Kölle; Gerhard Hauenstein, both of Nürnberg, all of Fed. Rep. of Germany

[73] Assignee: U.S. Philips Corp., New York, N.Y.

[21] Appl. No.: 91,672

[22] Filed: Aug. 31, 1987

[30] Foreign Application Priority Data

Sep. 3, 1986 [DE] Fed. Rep. of Germany ....... 3629931

[51] Int. Cl.$^4$ .......................... H04L 7/00; H04L 7/10
[52] U.S. Cl. .................................... 455/58; 340/825.5; 340/825.14; 340/825.2; 375/107; 370/100
[58] Field of Search ............................. 455/89, 58, 68; 375/107; 340/825.5, 825.14, 825.2; 379/58, 62, 63, 171; 370/100

[56] References Cited

U.S. PATENT DOCUMENTS

| | | | |
|---|---|---|---|
| 4,270,211 | 5/1981 | Schlichte | 375/107 |
| 4,370,648 | 1/1983 | Wagner et al. | 340/825.2 |
| 4,694,291 | 9/1987 | Denhez et al. | 340/825.2 |

OTHER PUBLICATIONS

*PKI Technische Mitteilungen*, No. 1, 1985, pp. 18–26.

*Fernmelde-Praxis*, Band 59; Nov. 25, 1982; pp. 887 to 910.

Primary Examiner—Robert L. Griffin
Assistant Examiner—Ralph Smith
Attorney, Agent, or Firm—Thomas A. Briody; Algy Tamoshunas; Leroy Eason

[57] ABSTRACT

In a mesh telecommunication network in which a hierarchic synchronization method is used for synchronizing the clock pulses of exchanges in such network, a class identification is assigned to the clock pulses of each echange corresponding to a hierarchical order of all the exchanges in the network. To maintain synchronization regardless of changes in the network configuration or failure of interconnecting lines, a synchronization identification is additionally assigned to each exchange. Each exchange transmits its class and synchronization identifications to the exchanges connected thereto, and all the identification received at any exchange are compared to determine the exchange connected thereto having the highest class identification and the highest synchronization identification in such class. The sychronizing clock pulses of such highest order exchange are then used for synchronization. Each exchange may also add to its identifications a mark to distinguish different operating conditions of the network. The reception at each exchange of the class and synchronization identifications transmitted by exchanges connected thereto is effected within presettable time intervals.

6 Claims, 9 Drawing Sheets

FIG.7

HIERARCHIC SYNCHRONIZATION METHOD AND CIRCUIT ARRANGEMENT FOR EXCHANGES OF A MESH TELECOMMUNICATION NETWORK

BACKGROUND OF THE INVENTION

1. Field of the Invention

The invention relates to a hierarchic synchronization method for exchanges in a mesh telecommunication network.

2. Description of the Related Art

Mobile automatic telephone exchanges are frequently used for military purposes and also be certain customers such as the police, civil defense, large building sites. In such a mobile automatic telephone system all the subscribers can be reached directly and without delay by automatic dialling in their own area and also in similar, neighbouring areas. In such a mobile automatic exchange system it is a requirement that the network can be established and changed rapidly, so that for the connection set-up the required exchange units can be selected in accordance with the instantaneous operating conditions and a change in location of the subscriber is possible without a disturbance in the network organization.

Each subscriber has its own dialling number, which depends on where in the network the subscriber is present at that moment. The mobile automatic exchange system must then be adapted to the variable expansion of the network, to the changing network structure, to the significantly fluctuating traffic load and to the changing availability of connecting paths.

A multi communication system MKS 200 is extensively described and explained in the Philips publication PKI Technische Mitteilungen No. 1/1985, pages 18 to 26. The configuration of the network using a homing method and the requirements made on the network synchronization are described in detail in chapter 3 "Netzaspekte", page 23, centre column, to page 26, left-hand column. As regards the network synchronization, it is stated on page 25, left-hand column that the configuration of the clock distribution network (clock tree) is effected in the central character channel by means of network management reports.

A number of different synchronization methods are known for the network synchronization, which are described in greater detail in the publication Fernmelde-Praxis, Band 59 dated Nov. 25, 1982, pages 887 to 910, more specifically page 892. As regards the hierarchic master-slave method it is described on page 892 that this method is particularly suitable for mesh networks. An exchange then functions as the master with its own independent clock, which is used to control the clocks of the sub-ordinate slave-exchanges. In this situation, an identification is assigned to each clock in accordance with its position in the hierarchy, the slave clock which is next in the hierarchy being automatically used for the synchronization when the master clock fails.

In the hierarchic master-slave synchronization method, information about the hierarchic status of the exchanges must continuously be transmitted and evaluated in each exchange. In a mobile automatic exchange system comprising a plurality of exchanges, this results in a heavy traffic load in the exchanges during the transmission and evaluation of the synchronization reports transmitted in the central character channels. When the master clock fails or the connecting line between the master exchange and the slave exchange fails, the re-establishment of the synchronization requires in the event of a long identification, a great deal of time to re-detect the master clock.

The Fernmelde-Praxis Publication does not contain any further explanation of how and in what manner the slave clock next highest in the hierarchy is obtained on failure of the master clock.

SUMMARY OF THE INVENTION

The invention has for its object to provide a hierarchic synchronization method of such a type that network synchronization can be obtained within the shortest possible period of time and which ensures that network synchronization only slightly increases the traffic load in the exchanges.

The hierarchic synchronization method according to the invention has the advantage that the structure of the clock tree is automatically effected without knowledge of the network topology and that units already present in the telecommunication network can be used for the homing method (cf. the above-identified article in PKI Technische Mitteilungen 1/1985, pages 18 to 26). The cost and design effort for the clock messages (class and synchronization identification) regarding the memory in the individual exchanges is low and by using the synchronization method mentioned in the foregoing the shortest and free connecting path in the telephone network can be found in a simple way and manner.

The structure of the hierarchic synchronization method has the advantage that because of the time-evaluation it is not necessary to evaluate all the received clock messages, so that the load on the exchanges for the evaluation of the received clock messages can be reduced. As a result thereof the shortest clock tree is established in a simple way and manner.

The structuring of the hierarchic synchronization method has the advantage that the structure of the clock tree is unambiguously ensured because of the additional marking.

A circuit arrangement for putting the method into effect only requires a corresponding programming of a control arrangement required for the homing method.

BRIEF DESCRIPTION OF THE DRAWINGS

The invention and its advantages will now be described in greater detail with reference to the embodiments for different operating conditions of the telephone network, shown in the accompanying drawings, wherein.

DESCRIPTION OF THE PREFERRED EMBODIMENTS

Figure 1:
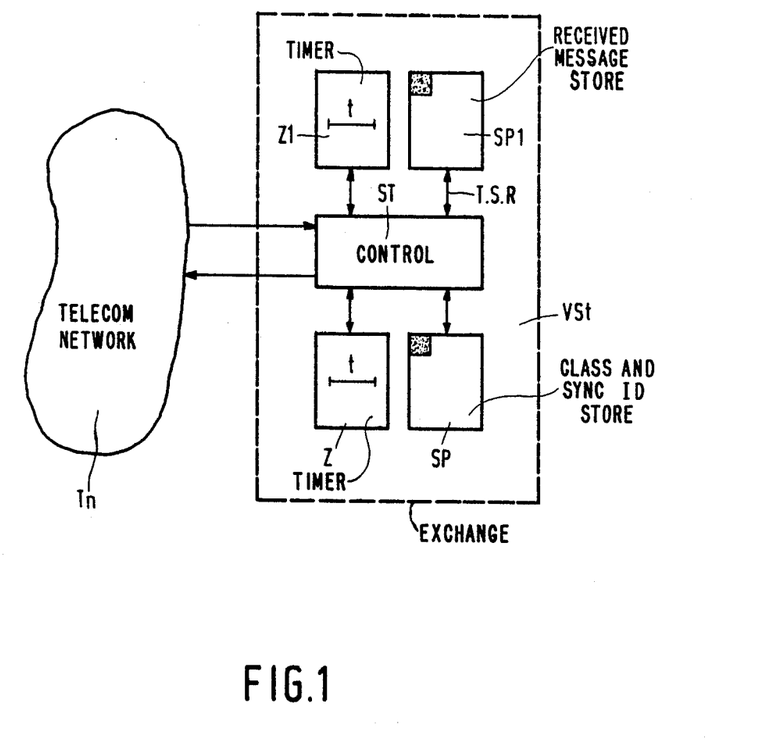
FIG. 1 shows an embodiment of a circuit arrangement for effecting the method according to the invention.

FIG. 1 shows an embodiment for effecting the hierarchic synchrnization method according to the invention. An exchange VST includes a control arrangement ST which is in connection with the telecommunication network Tn and at least one memory SP connected thereto. In this store SP both class and synchronization identification are stored for the exchange VST. On switch-on of the exchange VSt the class and synchronization identification assigned to this exchange is first stored in store Sp and is retained therein. In addition, the exchange VSt includes at least one timer member Z which is connected to the control arrangement ST and is started on transmission of the class and synchronization identification and is reset again on receipt of this class and synchronization identification.

The hierarchic synchronization method according to the invention will now be described in greater detail for different network configurations and different operating conditions in the telecommunication network.

The network synchronization is effected without knowledge about the lay-out of the network, so that also when, for example, the telecommunication network is partially disturbed, operation is still possible as the clock dependence of the exchange VSt is always regulated unambiguously. If in the synchronization procedure a switch to a different connection line is effected in the exchange VSt, then only interference noise is produced in the connection but no speech connection will be lost.

The clock network is automatically set-up or re-adjusted at each change in the lay-out of the network. Such changes in the lay-out of the network are caused by:

1. putting the line network and also network extensions into operation
2. putting connection lines into operation and failure of these connection lines of the telecommunication network
3. failure of individual exchanges VSt
4. putting a network interface connection line into operation in a hierarchic telecommunication network and failure of this network interface connection line and
5. putting a network interface connection line into operation in a hierarchic telecommunication network having two mesh networks on the same hierarchic network level and failure of this network interface connection line.

To determine the order of priority of the different exchanges VSt and consequently the clock dependency, a class identification and a synchronization identification is assigned to each exchange VSt. Dividing the exchanges VSt into the individual classes, can, for example, be effected in the following way:

class 1: exchanges VSt having network interface connection lines to exchanges VSt of a higher network level
class 2: exchanges VSt having network interface connection lines to exchanges VSt which are arranged in a mesh network of the same hierarchic level and have a network interface connection line to an exchange in a higher hierarchic level
class 3: exchanges VSt without network interface connection lines.

The class-1 exchanges VSt 1 have the highest priority and a specific synchronization identification which differs from exchange to exchange is is assigned to all the exchanges VSt of the telecommunication network, the synchronization identification having the number 1 signifying the highest priority.

In the FIGS. 2 to 7 the various exchanges VSt are represented by blocks, the indications in the blocks denoting the class identification by means of the first number and the synchronization identification by the second number. The broken line refers to a connection line without clock recovery, the solid line refers to a connection line through which a clock is conveyed, the arrow tips indicating the direction of the clock pulse. For the purpose of network synchronization, clock messages T, master search messages S and master reset messages R are transmitted through the central control channel and are stored in each of exchanges VSt in the memory SP1. The messages T, S, R always contain the number of the transmitting exchange VSt.

The clock messages T (completed in the FIGS. 2 to 7 by the class identification and synchronization identification) are used for the purpose of determining the clock dependency between two exchanges VSt. When an exchange VSt receives a clock message T of a higher priority, then it conveys this clock message T further to all the other connection lines and selects as connection path that connection line by which the higher priority clock message T was first received. As a result thereof, when there is a multiplicity of incoming clock messages T of the same priority, these messages are not processed any further. To ensure that an error-free clock tree can be produced also when a plurality of events occur simultaneously and the messages overlap, a mark to distinguish between different operating conditions in the telecommunication network is added on transmission of the clock messages T. The different operating conditions are, for example:

(a) putting a connection line into operation
(b) multi-channel search
(c) re-synchronization after the synchronization has got lost.

The marks are processed in accordance with the priority, the mark relating to the re-synchronization having the highest priority.

The master search messages S have for their object to determine, when a connection line fails, whether a further connecting path to the originating clock master is available. On receipt of a master search message S the clock master is introduced by transmitting a clock message T, for formation of a new clock tree. In addition to the number of the transmitting exchange VSt a further number can be added to the master search method S, to enable the detection of a multiple reception of the same master search message S.

The master reset message R has for its object to introduce a complete re-synchronization of the telephone network. This is effected when, for example, the original clock master of the highest priority has disappeared. Also for the master reset message R a number can be added additionally to the number of the transmitting exchange VSt, to enable detection of a multiple reception of the same master reset message R.

Figure 2A:
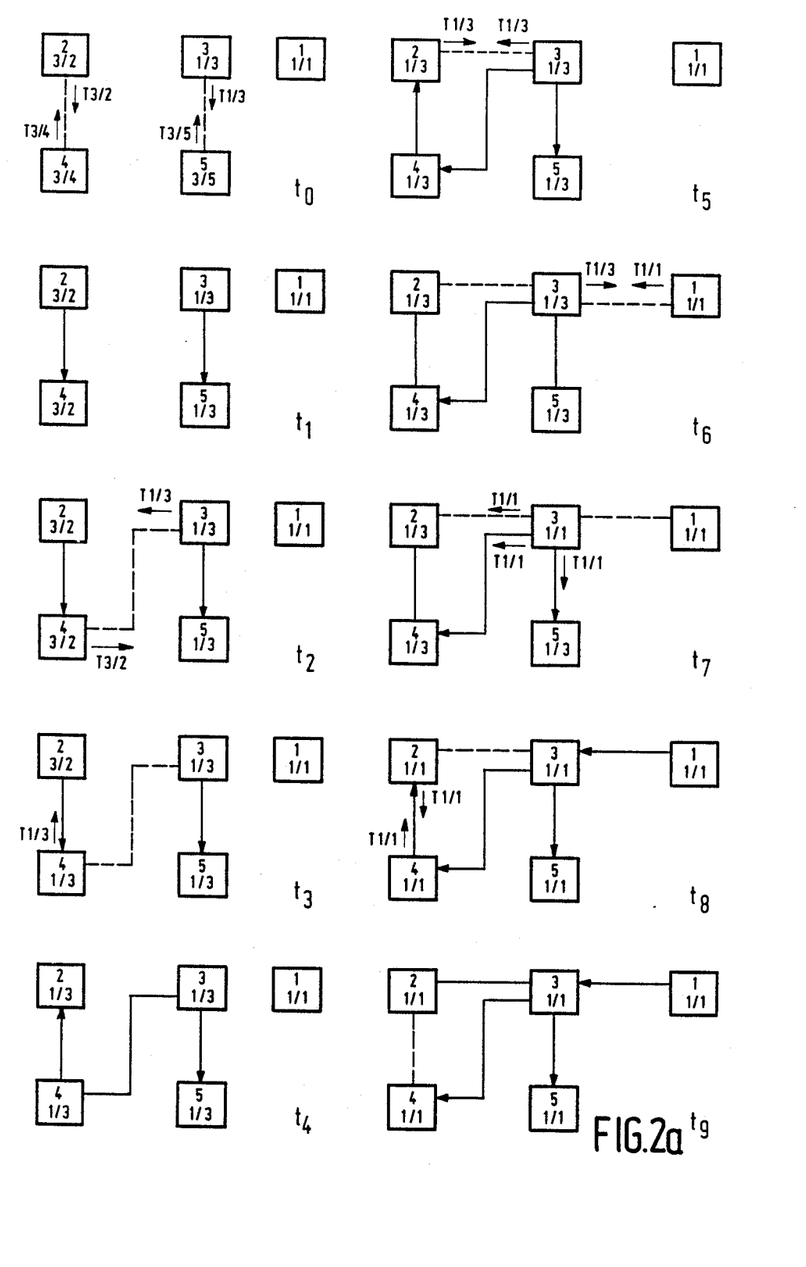
FIGS. 2a and 2b show the synchronization procedure for making connecting lines operative.

Putting the connection lines of the telecommunication network into operation will be described and explained with reference to FIG. 2, a mesh network being the basic network structure. At the instant $t_0$ two connection lines are made operative and the order of priority of the participating exchanges 2, 4 and 3, 5, respectively, is determined by means of the clock messages T3/2, T3/4 and T1/3, T3/5, respectively. As has already been described in the foregoing, the different numbers always indicate the class identification and the synchronization identification at the clock message T.

At the instant $t_1$ the clock dependency between the various exchanges 2 to 5 has been determined, the exchange 4 taking over the clock of the higher priority from the exchange 2 and the exchange 5 taking over the higher priority clock from the exchange 3. This creates two network islands.

At the instant $t_2$ a connection line between the two network islands is put into operation and the order of priority of the clock pulses is determined by means of the clock messages T1/3 and T3/2.

As the exchange 3 has the highest priority within the line network, the exchange 4 transmits at the instant $t_3$ the clock message T1/3 received from exchange 3 to all the connecting lines to the neighbouring exchanges VSt, that is to say to the exchange 2.

At the instant $t_4$ a switch to the clock of the exchange 3 is effected in the exchanges 2 and 4.

At the instant $t_5$ a further line bundle is taken into operation between the exchanges 2 and 3. Clock messages T1/3 are exchanged between the two exchanges and since the clock messages received all have the same priority, the exchangex 2 and 3 do not respond (both exchanges obtain the clock from the same clock master). For the event in which at that moment a search for a secondary path is effected, the clock messages T of the same priority are conveyed to the exchange VSt connected to the exchange VSt.

Figure 2B:
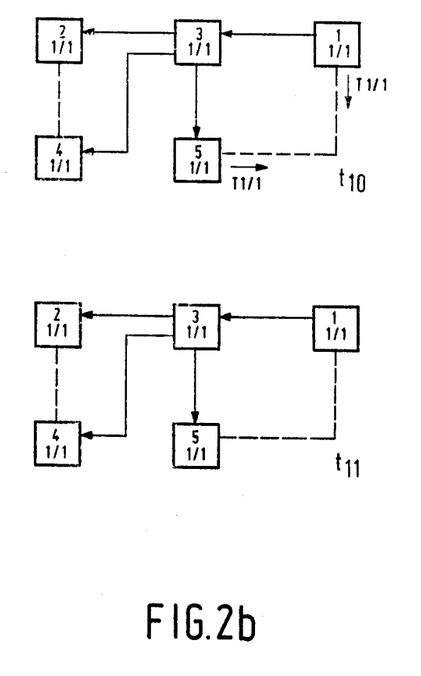

If on making a connecting line operative a search for a secondary path or a re-synchronization is effected at that very moment then no clock messages T are transmitted but the corresponding master search message S or master reset message R is transmitted by the exchange VSt. At the instant $t_6$ the line network is extended by the exchange 1. Clock messages T are then exchanged between the exchanges 1 and 3.

As the exchange 1 has the highest priority synchronization identification number, the exchange 3 transmits at the instant $t_7$ the received clock message T1/1 from exchange 1 via all the connecting lines to the connected exchanges 2 and 4.

At the instant $t_8$ the exchange 3 takes the clock from the exchange 1. Clock messages T1/1 are exchanged between the exchanges 2 and 4.

At the instant $t_9$ the exchange 2 switches to another exchange to receive the clock message therefrom, as a result of which a synchronous clock tree is set-up within the line network. At the instant $t_{10}$ a new connecting line between the exchanges 1 and 5 is made operative. Clock messages T1/1 are exchanged between the two exchanges 1 and 5.

Since the exchanges 1 and 5 have the same clock master, the clock tree is not changed at the instant $t_{11}$.

The hierarchic synchronization method will now be described in greater detail for the event of failure of a connecting line in the telephone network with reference to the FIGS. 3a and 3b. If a connecting line to which no clock transmission has been effected, fails, then this does not have any effect in the network synchronization in an exchange VSt. If a connecting line via which the clock master was transmitted to an exchange VSt fails, the eschange VSt tries to find a second connection path to the original clock master.

Should now only one single connection path to the neighbouring exchanges VSt be operative, this connecting line cannot be immediately used for clock extraction, as the neighbouring exchanges VSt may already be using this connecting line for clock extraction. Upon transmission of the master search message S it can be ensured that no clock loops are established.

The exchanges VSt convey the received master search message S via the specific connecting lines to all the connected exchanged VSt. The search procedure is supervised in that exchange VSt whose connecting line via which the clock was obtained, has failed. During this period of time no clock messages T are processed because of the fact that line bundles are made operative. If during the search procedure such a connection line is taken into operation, the master search message S is transmitted via this connection line instead of the clock message T. When all the connection lines to neighbouring exchanges fail, the exchange continues operations as an island and derives the clock from its own clock source.

The hierarchic synchronization method will now be described in greater detail for the case in which a secondary path to the original clock master in the telecommunication network is available (cf. FIG. 3a). On transmission of the class and synchronization identification the control arrangement ST starts the timing member Z whose time delay is chosen to have such a value that the master search message S can pass through the overall telecommunication network. If the control arrangement ST receives the master search message S during the time delay, then the timing member Z is reset again and re-started from the control arrangement ST. This prevents overlapping of master search messages S during the set-up of the new clock tree.

As soon as the time delay has ended, the exchange VSt again transmits the class and synchronization identification, only the mark for identifying the clock message being added to enable a distinction between the functions of the transmitted class and synchronization identifications. As has already been described in the foregoing, the clock message T is evaluated by the exchange VSt to determine the clock having the highest priority. In a further embodiment of the invention, the time delay of the timing member Z can be chosen such that the propagation times of both the master search message S and the clock message T are taken into account. Should a plurality of clock masters be present in the telecommunication network, the clock having the highest priority is determined in each exchange VSt on the basis of the received class and synchronization identification and the clock tree is built up.

Figure 3A:
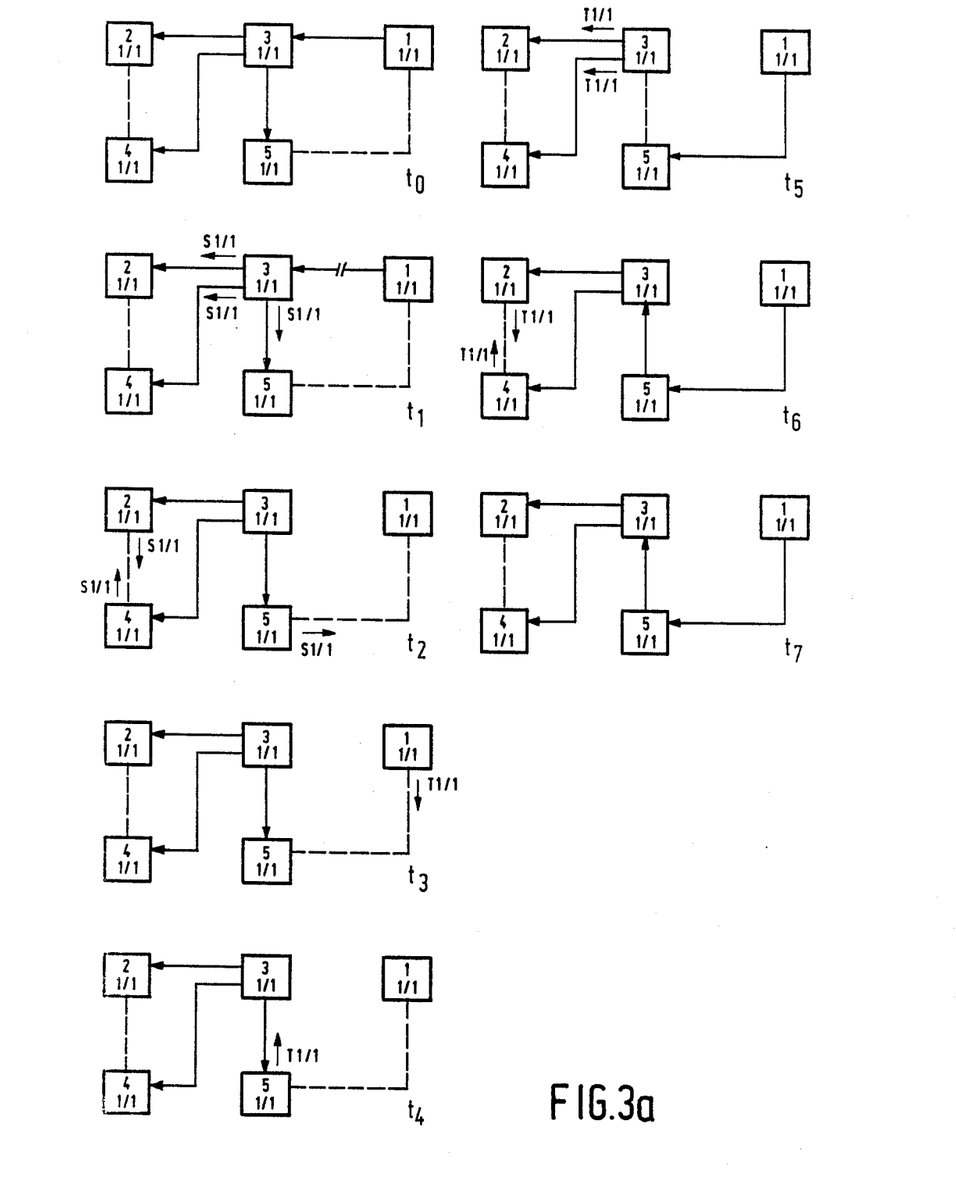
FIGS. 3a and 3b show the synchronization procedure on failure of a connecting line.

At the instant $t_0$ in FIG. 3a the network is in its synchronized state, the exchange 1 having the clock having the highest priority and the further exchanges 2 to 5 employing this clock for the purpose of synchronization.

At the instant $t_1$ the connection line between the exchanges 1 and 3 fails. This failure of the connection line is detected by the control arrangement St in the exchange 3 and master search messages S1/1 are transmitted by the control arrangement ST via the connection lines to all the connected exchanges VSt.

The master search messages S1/1 received by the exchanges 2, 4 and 5 are also transmitted at the instant $t_2$ to all the connected exchanges VSt via all the connection lines.

At the instant $t_3$ the exchange 1 receives the master search message S1/1 transmitted by the exchange 5, in response to which the control arrangement ST in the exchange 1 now transmits a clock message T.

The clock message T1/1 received by the exchange 5 via the connection line between the exchanges 1 and 5 is transmitted by the control arrangement ST of exchanges via the connection line to exchange 3 at the instant $t_4$.

At the instant $t_5$ the exchange 3 transmits the received clock message T1/1 to the exchanges 2 and 4 connected thereto via the connection lines.

In the exchange 3 the clock is changed-over at the instant $t_6$ and the exchanges 2 and 4 transmit the received clock messages T1/1 to the exchanges connected thereto.

The synchronized network condition has been obtained again at the instant $t_7$.

Figure 3B:
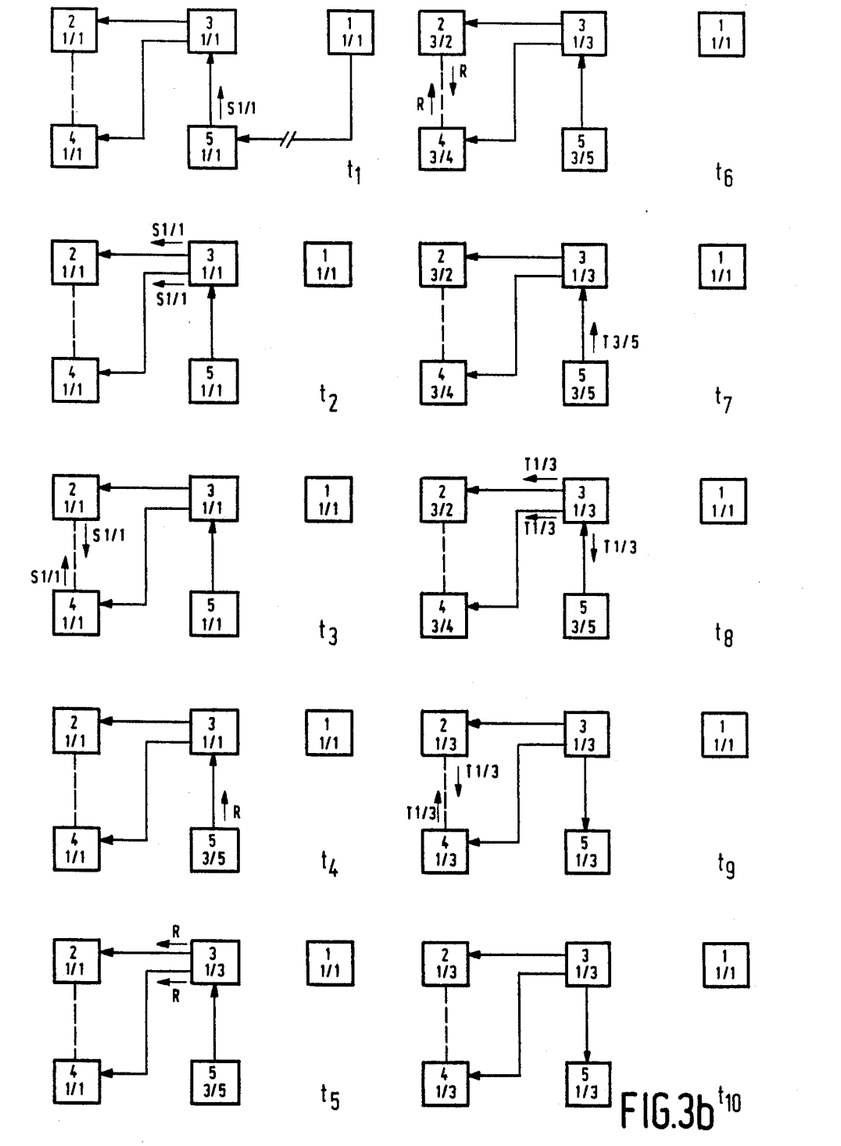

With reference to FIG. 3b the case will now be described in which no secondary path to the original clock master exchange 1 is available in the telecommunication network. During the time delay produced by the timing member Z no transmitted master search messages S are received from the exchange 1, so that the control arrangement ST in exchange 5 sends a master search message R for the re-synchronization of the network. In the case of an outage of this exchange 5 during the seach procedure, all the exchanges 5 connected to this exchange VSt detect this, as a result of which they initiate a new trial to search for a secondary path by means of the master search messages S. This search for a secondary path is now supervised as regards its duration in the exchanges VSt which initiated the master search procedure. This ensures that the telecommunication network is always re-synchronized also when the original clock master exchange 1 and the exchange 5 initiating the secondary path search should fail during the search procedure.

At the instant $t_0$ the telecommunication network is in the synchronized state and the exchange 1 has the original clock master having the highest priority.

At the instant $t_1$ the exchange 5 detects the failure of the connection line to exchange 1 and transmits a master search message S1/1 to all the exchanges connected to the exchange 5.

At instant $t_2$ the exchange 3 conveys the master search message S1/1 received from the exchange 5 to the exchanges 2 and 4, connected to the exchange 3.

These exchanges 2 and 4 transmit the master search message S1/1 at the instant $t_3$.

As in the exchange 5 the transmitted master search message was not received again from the exchange 1 at the instant $t_4$, a re-synchronization of the telecommunication network is required. Consequently the exchange 5 transmits a master reset message R at the instant $t_4$, in response to which the re-synchronization of the telecommunication network is initiated and the control arrangement ST starts the timing member Z1.

At the instant $t_5$ the exchange 3 conveys the received master reset message R to all the exchanges connected to this exchange 3.

The exchanges 3 and 4 transmit the master reset message R at the instant $t_6$.

At the instant $t_7$ the time delay has ended in the exchange 5, so that the exchange 5 is the first exchange to transmit a clock message T3/5. This clock message T3/5 is received by the exchange 3 and utilised to determine the clock having the highest priority.

Since the clock of the exchange 3 has a higher priority the exchange 3 transmits a clock message T1/3 to all the connected exchanges at the instant $t_8$.

The exchanges 2, 4 and 5 change-over the clock at the instant $t_9$, and transmit the clock message T1/3 so that the network-synchronous state has been obtained again at the instant $t_{10}$.

The following description of the hierarchic synchronization method is based on the assumption that a network interface connection line to an exchange of a higher hierarchic network level is taken into operation. Several cases can then be distinguished:

1. The exchange VSt with the network interface connection line does not have the highest priority, neither before nor after reception of the clock. In this case the exchange VSt only notices the changed priority and the structure of the clock tree is not affected thereby.

2. The exchange VSt has already the clock having the highest priority. In this case a clock message T is transmitted to all the connected exchanges VSt, using the new class and synchronization identification.

3. On the basis of the new priority, the exchange VSt now becomes the clock master and the clock tree is now established by this exchange VSt (cf. FIG. 4).

If a network interface connection line is taken into operation whilst a re-synchronization is effected in the telecommunication network, then the new class is only stored in the exchange VSt. If at the very moment a search for a secondary path is effected in the telecommunication network, then the search is interrupted by the exchange VSt and a resynchronization is initiated, and the exchange VSt to which the newly operative telecommunication interface is connected becomes the clock master. If not, the new class is only taken for granted in the exchange VSt.

Figure 4:
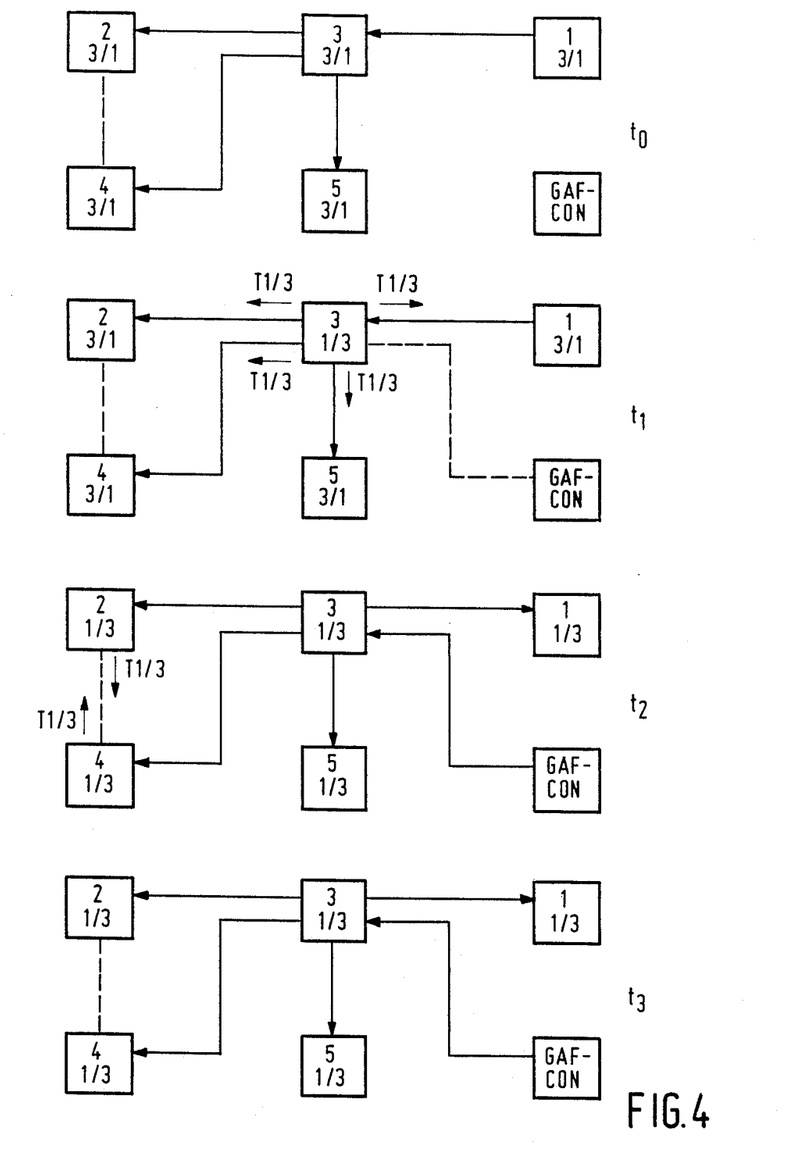
FIG. 4 shows the synchronization procedure in a hierarchical telecommunication network.

At the instant $t_0$ in FIG. 4 the network-synchronous state is existing and because of the higher priority the synchronization identification is the clock master. At the instant $t_1$ the network interface connection line from exchange 3 to the exchange GAFCON of a higher network level is made operative. Since the exchange 3 at the instant $t_1$ thereby has a clock having the highest priority it transmits clock messages T1/3 to all the connected exchanges. At the instant $t_2$ the exchanges 1 and 3 change-over their clocks whilst the exchanges 2 and 4 transmit the clock messages T1/3. At the instant $t_3$ the network-synchronous state is obtained again, the clock tree being established from the exchange GAFCON of the higher network level.

Figure 5:
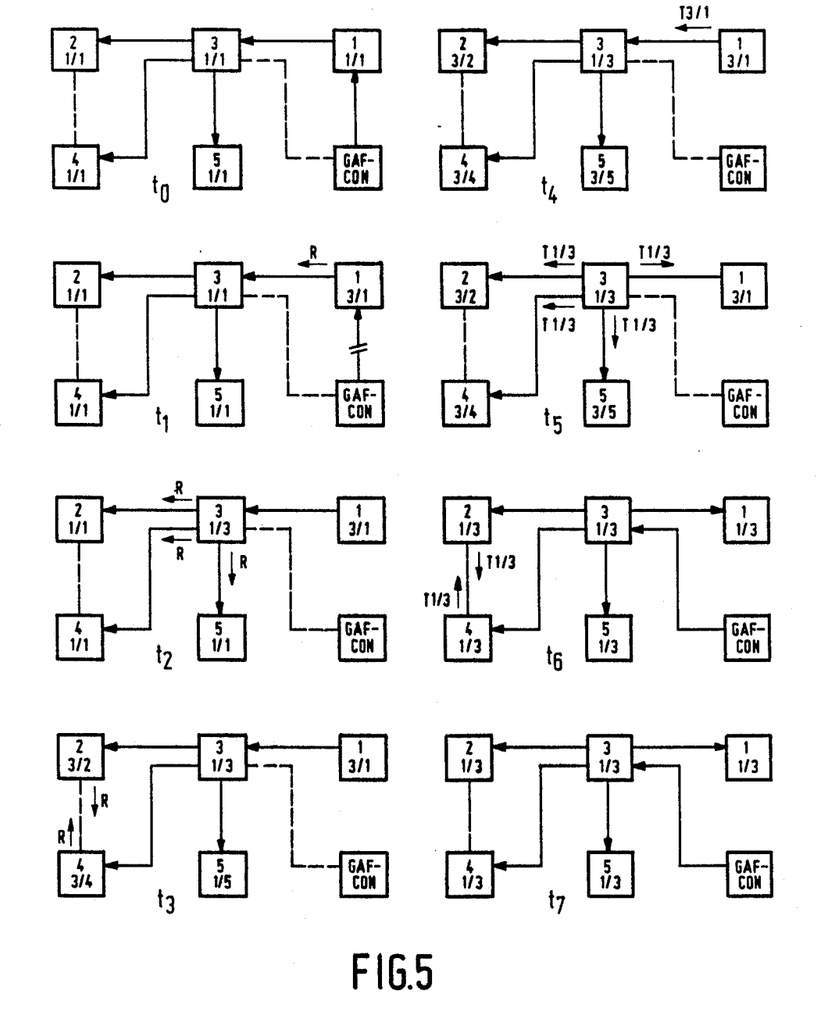
FIG. 5 shows, for a telecommunication network as shown in FIG. 4, the synchronization procedure on failure of the network interface connecting line.

The following description with reference to FIG. 5 is based on the assumption that a further network interface connection line to the exchange GAFCON of the higher network level is existant, and that the network transition connection line being which the clock tree was established (has failed). If in contrast thereto, an exchange fails which indeed has a network interface connection line to an exchange of the higher network level but is not the clock master, then this is noted in the exchange, and since the clock master is available without any change, this does not have any influence on the established clock tree in the line network. If however, as is shown in FIG. 5, the network interface connection line to the clock master fails, then the telecommunication network must be resynchronized as other exchanges VSt might already have network interface connection lines to exchanges GAFCON having a higher network level. As the network synchronization is effected without knowledge of the network configuration, this configuration must first be determined, a master reset message R being transmitted on failure of the network interface connection line in the telecommunication network. To ensure that the master reset message R can pass through the total overall telecommunication network, the timing member Z1 is started on transmission, by the control arrangement ST, as a result of which the resynchronization starts with a delay equal to the time delay produced by the timing member. Each exchange VSt receiving a master reset message R starts the timing member SZ1 via the control arrangement ST and each exchange VSt for which the time delay has finished first, starts the resynchronization.

At the instant $t_0$ in FIG. 5 the telecommunication network is in the synchronized state and the exchanges 1 and 3 have a network interface connection line to the exchange GAFCON of the higher network level. The exchange 1 has the clock having the highest priority which it obtains via the network interface connection line to the exchange GAFCON of the higher network level. At the instant $t_1$ this network interface connection line to the exchange of the GAFCON of the higher network level becomes inoperative and the exchange 1 transmits a master reset message R to all the exchanges VSt connected thereto. At the instants $t_2$ and $t_3$ these exchanges VSt transmit the master reset message R to all the exchanges VSt connected thereto. As from the instant $t_0$ the time delay produced by the timing member Z1 has finished first in the exchange 1, this exchange starts the resynchronization at instantly and transmits a clock message T3/1. At the instant $t_5$ the exchange 3 detects that the clock assigned to it has the highest priority and also transmits its clock message T1/3 to all the exchanges connected to it. At the instant $t_6$ the exchange 3 switches to clock of the exchange GAFCON of the higher network level for the purpose of clock recovery via the network interface connection line. The exchange 1 detects that the clock of the exchange 3 has the higher priority and switches to the new clock master in the exchange 3 to derive the clock. At the instant $t_6$ the exchanges 1 and 2 transmit the clock messages T1/3 to all the connected exchanges. At the instant $t_7$ the network synchronous state has been obtained again, the clock tree having been structured via a different network interface connection line to the exchange GAFCON of the higher network level.

Figure 6:
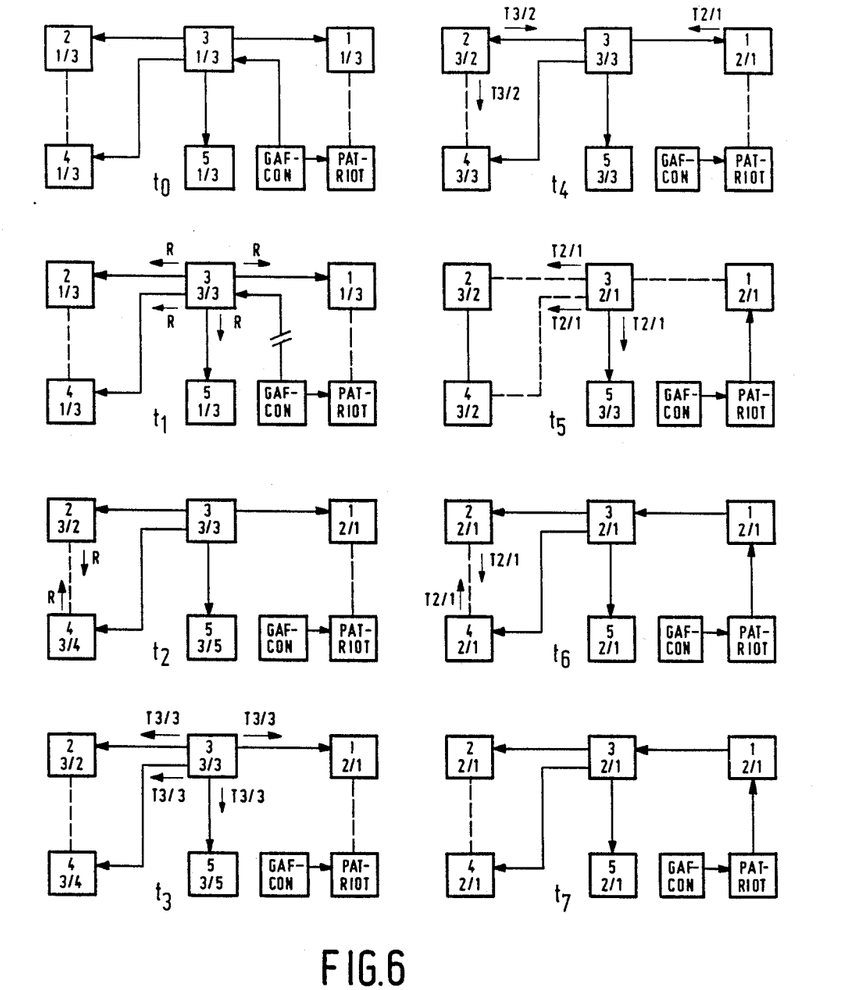
FIG. 6 shows the synchronization procedure in a hierarchic telecommunication network having two mesh networks on the same hierarchic network level and FIG. 7 shows for a telecommunication network as shown in FIG. 6 the synchronization procedure on failure of the network interface connection line to the exchange having a higher network level, a network interface connecting line being present between the two mesk networks.

The hierarchic synchronization method will now be described with reference to FIG. 6 for a telecommunication network having two mesh networks on the same hierarchic network level, the two mesh networks having network interface connection lines to an exchange GAFCON of the higher network level. When a network interface connection line to the exchange GAFCON of the higher network level fails, each exchange VSt having a connection line to the adjacent mesh network PATRIOT becomes the clock master. This accomplishes that via the neighbouring mesh network PATRIOT a connection path can be set up to the exchange GAFCON of the higher network level.

At the instant $t_0$ the network synchronous state is obtained and the exchange 3 conveys its clock to the exchange GAFCON via the network interface connection line. There is a connection between the exchange 1 and the neighbouring mesh network PATRIOT, the neighbouring mesh network PATRIOT itself having a network interface connection line to the exchange GAFCON having the higher network level. At the instant $t_1$ the network interface connection line between the exchange 3 and the exchange GAFCON having the higher network level is interrupted. The exchange 3 transmits master reset messages F to all the connected exchanges and starts the timing member Z1. At the instant $t_2$ the class and synchronization identifications stored in the store SP have been assigned to the different exchanges VSt in response to the master reset messages R propagating in the mest network.

At the instant $t_3$ the time delay produced by the timing member Z1 has finished first in the exchange 3, so that this exchange starts the re-synchronization of the network and transmits a clock message T3/3 to all the connected exchanges VSt. On the basis of the comparison between the received clock message T and the class and synchronization identification stored in the store SP, the exchange 5 detects the lower priority and changesover its clock. This also occurs in the exchange 4. The exchanges 1 and 2 detect at the instant $t_4$ that the clock assigned to them has the higher priority and transmit corresponding clock messages T2/1 and T3/2 to all the connected exchanges. At the instant $t_5$ the exchange 4 changes its clock over in response to the received clock message having the higher priority, this changeover also occurring in the exchange 1 and 2.

The exchange 3 conveys the received clock message T2/1 having the highest priority to all the connected exchanges VSt. In response to this new clock message T2/1 having the higher priority the clock changeover or the conveyance of the clock message T2/1, respectively, is effected in the exchanges 2, 3 and 4 at the instant $t_6$. At the instant $t_7$ the network-synchronous state has been obtained again in the mesh network, the clock being obtained via the exchange 1, which has a connection to the neighbouring mesh network PATRIOT.

The hierarchic synchronization method for a network structure constituted by two mesh network of the same hierarchic stage and a network interface connection line for one of the two mesh networks to an exchange GAFCON of the higher network level will now be described with reference to FIG. 7. If now the network interface connection line to the exchange GAFCON of the higher network level fails, this results in a re-synchronization in the mesh network, the neighbouring mesh network PATRIOT not being included in the network synchronization. As a result thereof the structure of clock trees via a plurality of mesh networks is avoided, a disadvantage being that possibly a poor quality of connections to the adjacent mesh networks may be of a poor quality.

Figure 7:
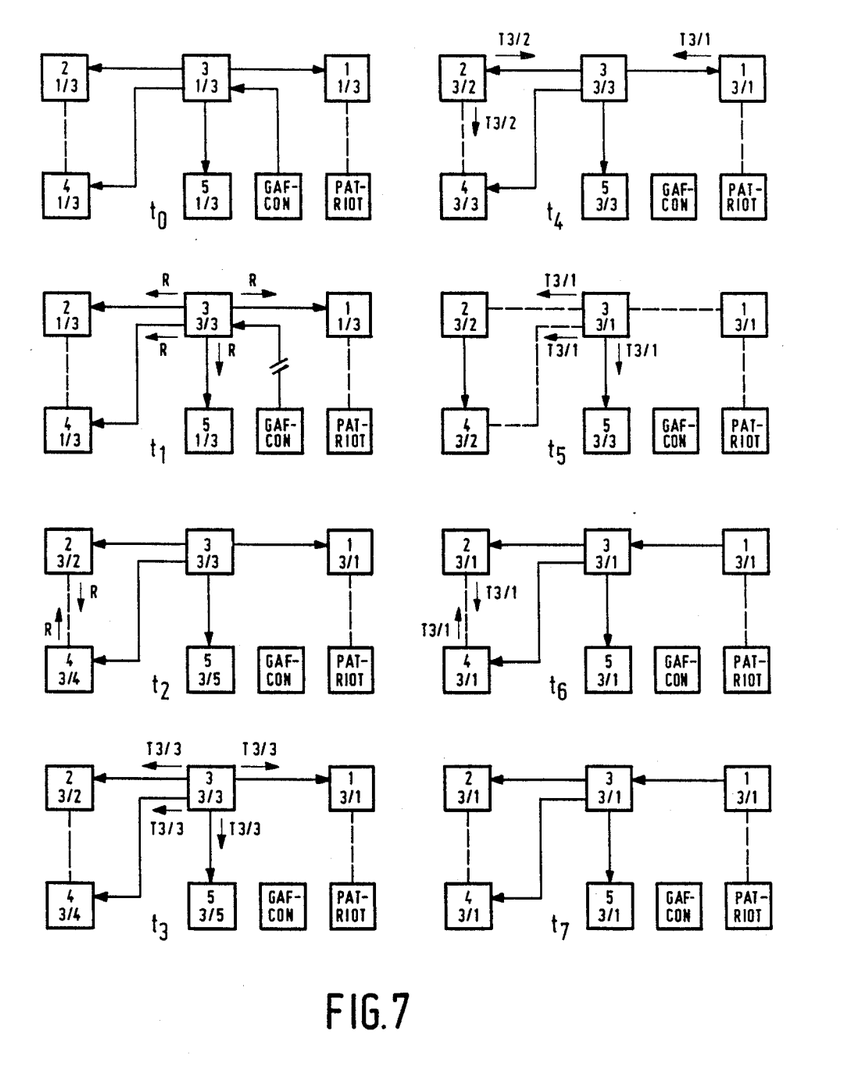

FIG. 7 shows the network-synchronous state at the instant $t_0$. The exchange 1 has a connection line to the neighbouring mesh network PATRIOT. At the instant $t_1$ the network interface connection line to the exchange GAFCON of the higher network level is interrupted, as a result of which the exchange 3 transmits master reset messages R to all the connected exchanges and starts the timing member Z1. At the instant $t_2$ the class and synchronization identifications stored in the store SP have been assigned to all the exchanges VSt of the mesh network. The time delay produced by the timing member Z1 ends first in the exchange 3 so that this exchange 3 is the first exchange to start the re-synchronization of the mesh network and transmits the clock message T3/3 to all the connected exchanges.

On the basis of the comparison between the class and synchronization identifications stored in the store SP and the received clock message T3/3 the exchange 5 detects at the instant $t_4$ the higher priority of the received clock message T3/3, changes over its clock and stores the clock message T3/3 in the store SP1. On the basis of the comparison, the exchanges 1 and 2 detect the higher priority of the class and synchronization identifications stored in the store SP and they transmit a clock message T3/1 and a clock message T3/2 to all the connected exchanges VSt.

On the basis of the comparison effected in each exchange VSt, the clock is changed-over in the exchange 4 at the instant $t_5$ and this is also effected in the exchange 2. The exchange 3 transmits the clock message T3/1 having the highest priority to all the connected exchanges VSt and the clock of the exchange 1 is used to derive the clock tree. At the instant $t_6$ the clock change-over action is effected in the exchanges 2, 3 and 4 and at the instant $t_7$ the network synchronous state has been obtained again. The clock having the highest priority is obtained from the exchange 1 of the mesh network.

What is claimed is:

1. A hierarchical synchronization method for a mesh network of telecommunications exchanges wherein the synchronizing clock pulses of each exchange are assigned a class identification corresponding to a hierarchical synchronization order of the exchanges in the network, such method comprising:

assigning to each exchange a synchronization identification signifying the relative priority of the clock pulses of such exchange in relation to clock pulses of other exchanges in said network;

transmission by each exchange of its class and synchronization identifications to all exchanges connected thereto;

determination in each exchange, from the class and synchronization identifications received thereby, of the exchange connected thereto having the highest class identification and the highest synchronization identification in such class, the synchronizing clock pulses of such highest order exchange being master clock pulses for exchanges connected thereto; and reception in each exchange of master clock pulses from the highest order exchange connected thereto and use of such master clock pulses by the receiving exchange for synchronizing the receiving exchange.

2. A method is claimed in claim 1, wherein after an exchange (VSt) has determined the class and synchronization identifications of the highest order exchange connected thereto, such exchange (VSt) transmits such highest order identifications to all other exchanges connected thereto, and each of such other exchanges synchronizes with the clock pulses of the exchange from which it first receives such highest order identifications.

3. A method as claimed in claim 1, wherein besides class and synchronization identifications each of said exchanges also transmit a mark identifying different operating conditions in said network and which of such conditions has the highest priority.

4. A mesh network of telecommunication exchanges wherein such exchanges are synchronized by a hierarchical synchronization method as claimed in claim 1, each such exchange (VSt) comprising:

a control arrangement (ST) for transmitting to said network the class and synchronization identifications of said exchange (VSt) and for receiving class and synchronization identifications from exchanges in said network which are connected to said exchange (VSt);

a first store (SP) connected to said control arrangement for storing said class and synchronization identifications of said exchange (VSt); and a second store (SP1) connected to said control arrangement for storing the class and synchronization identifications received from other exchanges in said network which are connected to said exchange (VSt);

said control arrangement comparing the class and synchronization identifications in said second store to determine the exchange having the highest class identification and the highest synchronization identification in such class, and utilizing synchronizing clock pulses received from such highest order exchange to synchronize said exchange (VSt).

5. A network as claimed in claim 4, characterized in that the exchange (VSt) further comprises at least one time delay member (Z) which is preset by said control arrangement (ST) upon transmission of the class and synchronization identifications of said exchange (VSt), and is reset again by said control arrangement (ST) upon reception thereby of class and synchronization identifications from another exchange in said network.

6. A network as claimed in claim 5, wherein the exchange (VSt) further comprises a second time delay member (Z1) which is preset by said control arrangement (ST) differently from the presetting of said first time delay member (Z), depending on particular operating conditions of said network.

* * * * *